United States Patent [19]

Koster et al.

[11] Patent Number: 4,713,977

[45] Date of Patent: Dec. 22, 1987

[54] FRICTION-DISK TRANSMISSION COMPRISING A TILTABLE DISK

[75] Inventors: Marinus P. Koster; Hermanus M. J. R. Soemers; Marinus J. J. Dona, all of Eindhoven, Netherlands

[73] Assignee: U.S. Philips Corporation, New York, N.Y.

[21] Appl. No.: 839,408

[22] Filed: Mar. 14, 1986

[30] Foreign Application Priority Data

Nov. 15, 1985 [NL] Netherlands ............. 8503140

[51] Int. Cl.$^4$ ............................................. F16H 15/16
[52] U.S. Cl. ........................................ 74/191; 74/199
[58] Field of Search ............. 74/191, 199, 190, 190.5, 74/209, 208, 211, 216, 721, 796; 403/360, 368, 367, 383, 291

[56] References Cited

U.S. PATENT DOCUMENTS

| | | | |
|---|---|---|---|
| 2,478,227 | 8/1949 | Banninser | 74/199 |
| 2,842,001 | 7/1958 | Hunting | 74/191 |
| 3,388,607 | 6/1968 | Stöker et al. | 74/191 |
| 3,844,137 | 10/1974 | Zugel | 403/291 |
| 4,466,303 | 8/1984 | Stöker | 74/191 |
| 4,515,028 | 5/1985 | Van Der Linden et al. | 74/191 |

Primary Examiner—Richard J. Scanlan, Jr.
Assistant Examiner—Peter M. Cuomo
Attorney, Agent, or Firm—Paul R. Miller

[57] ABSTRACT

The invention relates to a friction-disk transmission with a first shaft (19) and a coaxial second shaft (23) which are rotatable about a common axis of rotation (Z). The first shaft (19) is being coupled with a disk (1) which is tilted with respect to the axis of rotation (Z) and engages with friction a disk-shaped supporting member (11) secured to the second shaft (23) and rotatable about the axis of rotation (Z). The disk (1) is supported by an annular spring (3) and is tiltable about two axes (X, Y) which intersect each other perpendicularly and are located in a plane at right angles to the axis of rotation (Z). The tilting point (P) is located substantially at the point of intersection of the X-, Y- and Z-axes. The rotation of the disk (1) about the Z-axis is prevented by the annular spring (3).

The friction-disk transmission can be used in apparatus requiring comparatively large transmission ratios, for example if a vacuum-tight separation is desired between the first and the second shaft.

7 Claims, 8 Drawing Figures

FRICTION-DISK TRANSMISSION COMPRISING A TILTABLE DISK

The invention relates to a friction-disk transmission comprising a first shaft and a second shaft rotatable about a common axis of rotation, with the shafts being substantially aligned with each other, a circular disk arranged between the first and the second shaft and being tiltable in a point located on the common axis of rotation about two orthogonal tilting axes intersecting each other in the point, and each orthogonal tilting axis being perpendicular to the common axis of rotation by means of a drive coupled with the disk so as to be eccentric with respect to the axis of rotation, while rotation of the disk about the axis of rotation is blocked by a stationary fixing member and the rotation of the disk about the tilting axes is determined by a disk-shaped supporting member coupled with the second shaft.

In a disk transmission known from British Patent Specification No. 328907, the supporting member comprises a further disk which is secured to the second outgoing shaft and is provided with a lemniscate groove in which the tiltable disk is guided by means of balls. The fixing member is constituted by a fixedly arranged gear ring in which a toothing rolls which toothing is provided on the tiltable disk.

A disadvantage of the known disk transmission is that upon reversal of the direction of rotation of the first and the second shaft lost motion occurs due to the clearance with which the balls are guided in the lemniscate groove. Furthermore, it is fairly difficult to vary the transmission ratio because it depends upon the shape of the lemniscate groove. The necessity of a toothing on both the tiltable disk and the fixing member, and a relatively complicated guiding groove in the supporting member causes the known disk transmission to be relatively expensive.

The invention has for its object to provide a frictional disk transmission in which these disadvantages are avoided.

For this purpose, the invention is characterized in that the tiltable disk is supported within an annular spring which is secured along an outer circle to a fixing member and which is secured along an inner circle to the tiltable disk, while the disk can be rolled with frictional contact across a supporting member with, a corresponding circular path of the contact point between the disk and the supporting member occupying a fixed axial position with respect to the axis of rotation.

By the use of an annular spring in conjunction with an engagement of the disk with a supporting member excluding an axial displacement of the contact point, the tilting movements about the two tilting axes can be obtained by deformation of the spring, which serves at the same time as a bearing for the disk. Thus, the disk can be journalled in a considerably simpler manner. Furthermore, the transmission is fully free of clearance.

A preferred embodiment of the frictional disk transmission, in which the transmission ratio mainly depends upon the apex of a cone corresponding to a conical path on the supporting member, is further characterized in that the supporting member is provided with a first curved running surface, while the disk is provided with a conical second running surface cooperating with the first running surface with, the apex of the cone corresponding to the second running surface coinciding with the point of intersection of the two tilting axes on the common axis of rotation.

A further embodiment of the friction-disk transmission, in which the angular position of the disk with respect to the axis of rotation is defined in a comparatively simple manner, is characterized in that the first shaft is coupled with an end, acting eccentrically with respect to the common axis of rotation, of a clamping bushing which is rotatable about the axis of rotation by means of a draw rod arranged in the clamping bushing and rotatable about the axis of rotation with, this clamping bushing causing through a rotational bearing, tilted with respect to the axis of rotation and a bushing provided with cuts and tilted with respect to the axis of rotation, the annular spring to be bent and defining the tilting angle of the disk, while a U-shaped spring urges the disk in the contact point against the supporting member.

A further embodiment of a frictional-disk transmission, in which the angular position of the disk with respect to the axis of rotation is also defined in a further comparatively simple manner, is characterized in that the first shaft is provided with an eccentrically acting end, which causes the annular spring to be bent by a rotational bearing and a bushing provided with cuts and tilted with respect to the axis of rotation and defining the tilting angle of the disk, while a flexible rod defines the tilting point of the disk in the direction of the axis of rotation with, at least one further bushing provided with cuts urging the supporting member in the contact point against the disk.

A still further embodiment of the friction-disk transmission, which is particularly suitable for use in devices having a vacuum-tight separation between the first and the second shaft, is further characterized in that the annular spring is a closed flexible diaphragm forming a vacuum-tight seal between the first and the second shaft.

The invention will be described more fully with reference to the drawing, in which.

Figure 1:
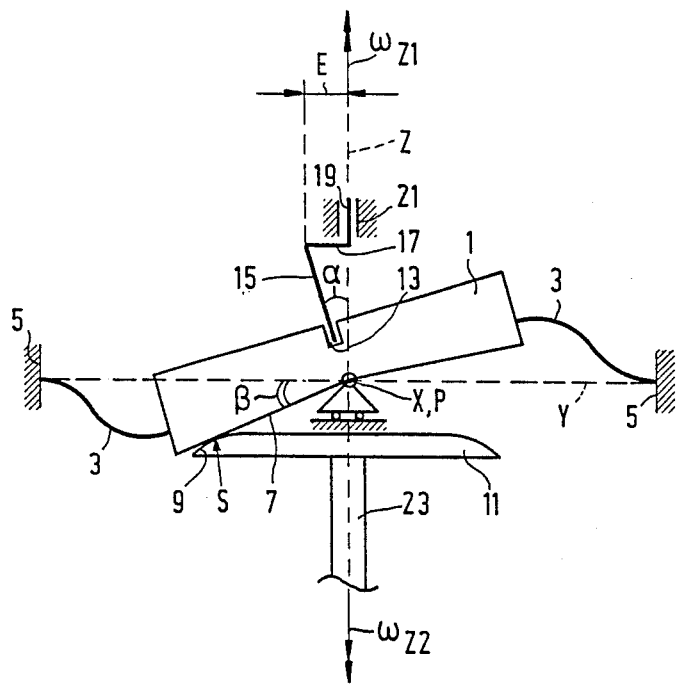
FIG. 1 shows diagrammatically a preferred embodiment of the friction-disk transmission.

The first embodiment of the friction-disk transmission shown in FIG. 1 comprises a circular disk 1 tiltable at a point P about an X-axis (at right angles to the plane of the drawing) and an Y-axis. Rotation of the disk 1 about the Z-axis is prevented by a flexible annular closed diaphragm 3 which in the unloaded condition lies in a plane at right angles to the Z-axis at the point P. The diaphragm is clamped along an inner circle to the disk 1 and is clamped along an outer circle to an annular fixing member 5. The disk 1 is provided on the lower side with a conical contour 7. The apex of the cone corresponding to the contour 7 coincides with the point P. At a point S the disk 1 is urged against a curved edge 9 of a rotatably arranged supporting member 11 in the form of a circular disk. The path of the contact point S between the disk 1 and the supporting member 11 is circular and lies in a plane at right angles to the Z-axis. A recess 13 of the disk 1 receives a coupling rod 15, which is secured by means of a crank rod 17 having a length E to a first incoming shaft 19. The shaft 19 is rotatably supported in a bearing 21. Although the clearance with which the coupling rod 15 is received by the recess 13 is shown on an exaggerated scale in FIG. 1, it must be assumed that only a light slide is present. It must further be assumed that both the recess 13 and the coupling rod 15 have a circular cross-section. The disk-shaped supporting member 11 has secured to it a second outgoing shaft 23 which is rotatable about the Z-axis and cannot perform a translation in the Z-direction. The Z-axis constitutes the geometric axis about which the first and second shafts rotate in common at angular speeds $\omega_{Z1}$ and $\omega_{Z2}$, respectively. The coupling rod 15 extends in a direction at right angles to the upper surface of the disk 1 and make an angle $\alpha$ with the Z-axis. The Y-axis and a generatrix of the cone corresponding to the contour 7 make an angle $\beta$ with each other. The transmission ratio between the first shaft 19 and the second shaft 23 satisfies the relation:

$$(\omega_{Z2}/\omega_{Z1}) = -\tan \alpha \cdot \tan \beta,$$

with the directions of rotation of the two shafts consequently being opposite to each other. During rotation of the two shafts, the disk 1 performs a tilting movement about an axis passing through the point P and rotates in a plane at right angles to the Z-axis through the point P at an angular speed $\omega_{Z1}$. This tilting movement can be considered as a simultaneous tilting movement about two orthogonal tilting axes, i.e. the X-axis and the Y-axis. In the present case, $\alpha = 0.5°$, while $\beta = 13°$ so that:

$$(\omega_{Z2}/\omega_{Z1}) = (-1/500).$$

The contact point S must be considered as a point at which rolling takes place without any slippage.

Since the angle $\alpha$ has a limited value due to the admissible deformation of and stress in the diaphragm 3, a large range of transmission ratios is obtained in practice by varying the angle $\beta$.

The invention will now be described with reference to two practical embodiments according to the principle of FIG. 1. In particular the mechanism is concerned by means of which the tilting angle $\alpha$ is obtained.

Figure 2:
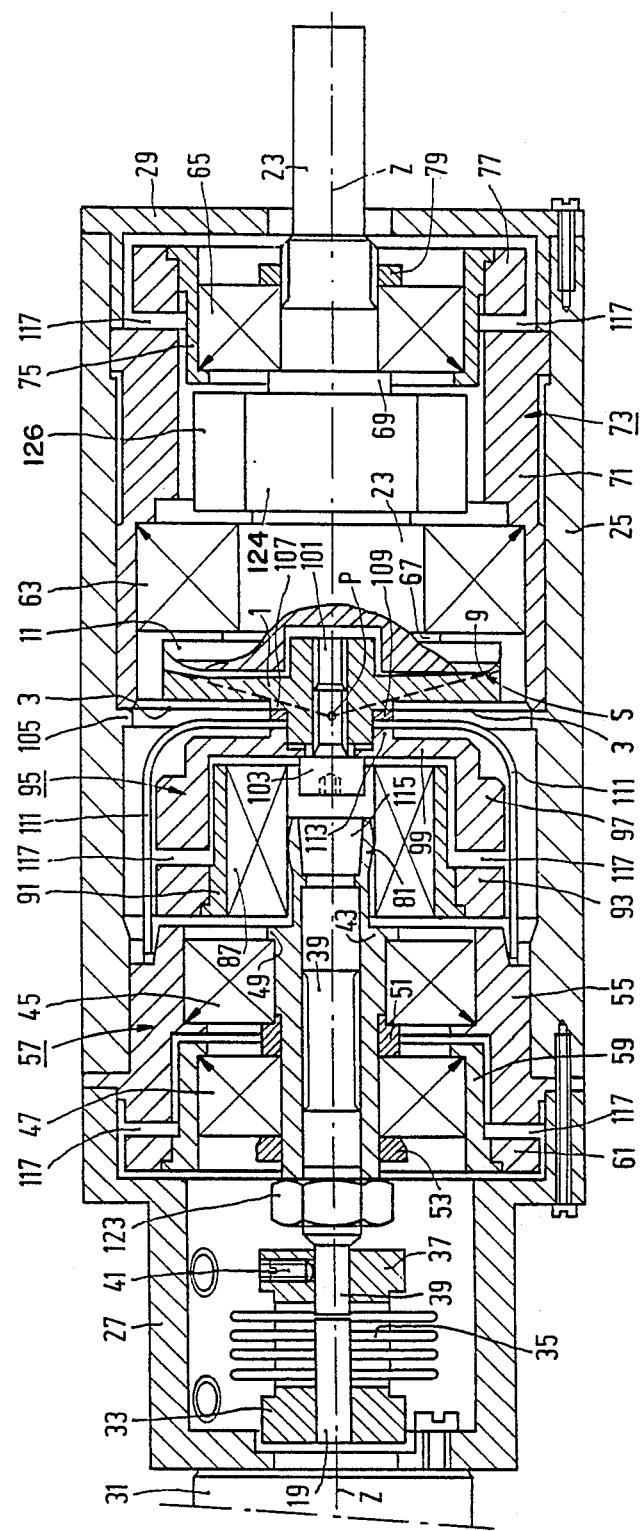
FIG. 2 is a longitudinal sectional view of a friction-disk transmission as shown in FIG. 1.
Figure 3:
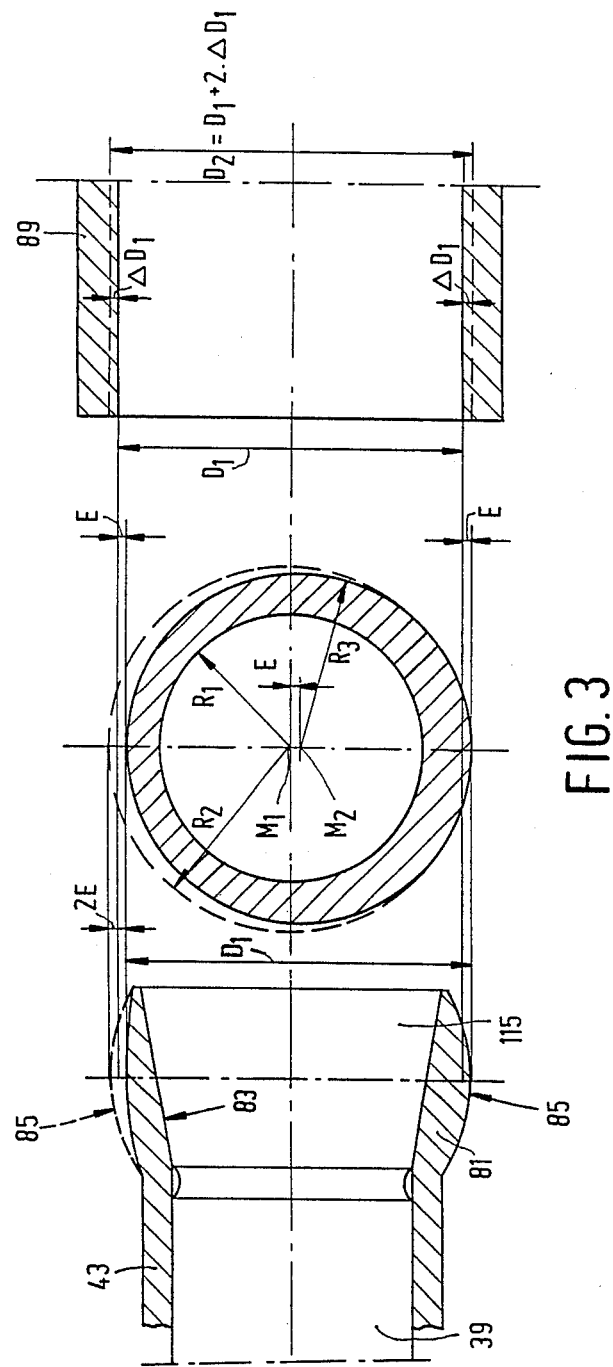
FIG. 3 shows on an enlarged scale a detail of the friction-disk transmission as shown in FIG. 2.
Figure 5:
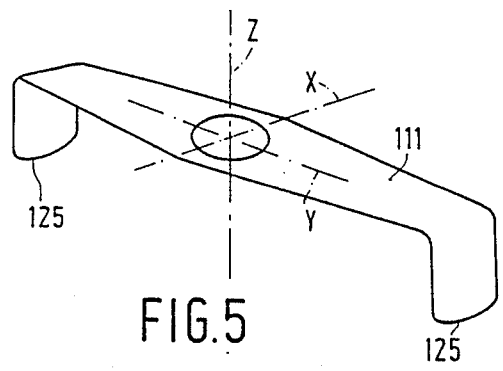
FIG. 5 is a perspective view of a U-shaped spring used in the friction-disk transmission as shown in FIG. 2.

The friction-disk transmission shown in FIG. 2 comprises a metal circular-cylindrical housing 25, whose center line coincides with the Z-axis. The housing 25 is provided at the lefthand side with a metal dish-shaped cover 27 and is provided at the righthand side with a dish-shaped cover 29 also of metal. The first incoming shaft 19 is constituted by the driving shaft of an electric motor 31. By means of a coupling comprising a metal sleeve 33 secured on the shaft 19, a bellow-shaped coupling member 35, and a metal sleeve 37, a metal draw rod 39 is driven, whose center line coincides with the Z-axis. It should be noted that the draw rod 39 can also be considered as the incoming shaft. For example, a driven pulley may be mounted on the draw rod 39 so that the shaft 19 may be dispensed with. The coupling member 35 is secured on the lefthand side to the sleeve 33 and is secured on the righthand side to the sleeve 37, which is mounted by means of a screw 41 on the draw rod 39. The draw rod 39 is passed into a metal clamping bushing 43 to be described more fully with reference to FIG. 3, on which two ball-bearings 45 and 47 are glued. The inner ring (not shown in FIG. 2) of the ball-bearing 45 is enclosed in the axial direction between a shoulder 49 on the clamping bush 43 and a metal spacer ring 51, while the inner ring (not shown in FIG. 2) of the ball-bearing 47 is enclosed in the axial direction between the spacer ring 51 and a metal screw ring 53, which is screwed onto a threaded part of the draw rod 39. The outer ring (not shown in FIG. 2) of the ball-bearing 45 is enclosed both in the axial and in the radial direction by a part 55 fixedly arranged in the housing 25 of a so-called concertina sleeve 57 of metal, which urges the ball-bearing 45 free of clearance and will be described more fully with reference to FIG. 4. The outer ring (not shown in FIG. 2) of the ball-bearing 47 is enclosed both in the axial and in the radial direction in a metal sleeve 59, which is secured to a part 61 of the concertina sleeve 57, which is displaceable in the axial direction with respect to the part 55 by means of the screw ring 53.

The second outgoing shaft 23 is journalled in two ball-bearings 63 and 65, whose inner rings (not shown) engage in the axial direction a shoulder 67 and a shoulder 69, respectively, of the shaft 23. The ball-bearing 63 and 65 are also glued on the second shaft 23. The outer ring (not shown) of the ball-bearing 63 is enclosed both in the axial and in the radial direction in a part 71 fixedly arranged in the housing 25 of a so-called concertina sleeve 73 of metal which urges the ball-bearing 63 free of clearance and is of the same type as the concertina sleeve 57. The outer ring (not shown) of the ball-bearing 65 is enclosed both in the axial and in the radial direction in a metal sleeve 75, which is secured to a part 77 of the concertina sleeve 73, and which is displaceable in the axial direction with respect to the part 71 by means of a metal screw ring 79 on the second shaft 23. At its lefthand end, the second shaft 23 is provided with a metal circular disk, which constitutes the supporting member 11. As stated, the metal tiltable disk 1 engages in the contact point S at the curved edge 9 of the supporting member 11. The construction, with which the angle $\alpha$ is obtained (in FIG. 1 the recess 13, the coupling rod 15 and the crank rod 17), will be described with reference to FIGS. 2, 3, 4 and 5, in which the construction of the concertina sleeves 57 and 73 will also be explained.

The righthand end of the clamping bushing 43 has a widening part 81 having a conical inner contour 83. The part 81 is originally central and rotation-symmetrical and has a slightly curved outer contour 85. When the clamping bushing 43 is mounted in a lathe with an eccentricity E and is then cut at the area of the largest outer periphery of the part 81, the cross-section is obtained indicated by shaded lines in the central part of FIG. 3. The originally largest diameter equal to 2R is thus reduced by a value 2E. The corresponding inner diameter amounts to $2R_1$. The material removed on the lathe is indicated by the difference in surface between a circle having a diameter equal to $2R_2$ and a center $M_1$ and a circle having a diameter equal to $2R_3$ and a center $M_2$. The distance between $M_1$ and $M_2$ is E. The part 81 of the clamping bushing 43 is passed into a needle bearing 87 (cf. FIG. 2), of which FIG. 3 only shows an inner ring 89. In order to facilitate the insertion, the inner diameter $D_2$ of the inner ring 89 is chosen slightly larger than the maximum outer diameter $D_1$ of the part 81 so that $D_2=D_1+2.D_1$. In the case in which the inner diameter of the inner ring 89 is defined, $D_1$ can of course be chosen slightly smaller ($\Delta D_1$) than $D_2$. It should be noted that the eccentricity E is considerably larger than $\Delta D_1$. In the present case, E is equal to 0.1 mm, while $\Delta D_1$ is equal to 2 $\mu$m. The outer ring (not shown in FIG. 2) of the needle bearing 87 is secured to a metal sleeve 91, on which a part 93 of a metal concertina sleeve 95 is mounted. This concertina sleeve 95 is of the same type as the aforementioned concertina sleeves 57 and 73. The concertina sleeves 57, 73 and 95 are not rotatable about the Z-axis. All concertina sleeves have a low resistance to bending, are slack in the axial direction, have a high resistance to torsion and have a high resistance to deformation by transverse forces. The concertina sleeve 95 further has a part 97, which due to elastic deformation is displaceable with respect to the part 93. Furthermore, the concertina sleeve 95 is provided, in deviation from the concertina sleeves 57 and 73, with a flange 99. By means of a bolt 103 screwed into a bore 101 of the tilting disk, the flange 99 is secured to the tilting disk 1. The diaphragm 3 is clamped along an outer circle between a shoulder 105 of the housing 25 (fixing member) and the lefthand end of the concertina sleeve 73. Along an inner circle the diaphragm 3 is clamped between a shoulder 107 of the tilting disk 1 and a metal spacer ring 109. A prestressed U-shaped metal spring 111 supported on the lefthand side from the concertina sleeve 57 (cf. FIG. 5) is pressed on the righthand side against the spacer ring 109 and is enclosed by a shoulder 113 of the flange 99 of the concertina sleeve 95. The spring 111 produces the contact force at the contact point S between the disk 1 and the supporting member 11. The draw rod 39 is provided with a conical end 115, whose contour corresponds to the conical contour 83 of the clamping bushing 43.

Figure 4:
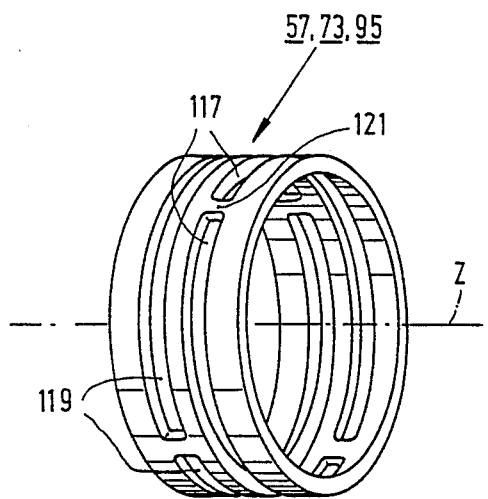
FIG. 4 is a perspective view of a part of the bushing provided with cuts.

As appears from FIG. 4, each of the concertina sleeves 57, 73 and 95 is provided with two pairs of sawcuts 117 and 119, which are rotated with respect to each other by 90°. Between the two saw-cuts of a pair are situated two material bridges, such as a material bridge 121 of the pair of saw-cuts 117. For the sake of simplicity, the saw-cuts of the concertina sleeves 57, 73 and 95 are designated in FIG. 2 by the same reference numeral 117. It will be appreciated that the concertina sleeves 57, 73 and 95 have to be able to readily take up axial deformations (slack in the axial direction) in the Z-direction and deformation (low resistance to bending) about the X-axis and the Y-axis.

If now the end 81 of the clamping bush 43 is inserted into the inner ring 89 of the needle bearing 87, the needle bearing 87, the sleeve 91, and the concertina sleeve 95 will become located so that their center lines are eccentric with respect to the Z-axis, while they also perform a tilting movement with respect to the end 81. The eccentricity amounts to E and the tilting angle is equal to $\alpha$. Due to the tilting movement through the angle $\alpha$ of the concertina sleeve 95, the tilting disk 1, coupled therewith also tilts through an angle $\alpha$. The end 81 is proportioned so that the point of engagement with the inner ring 89 of the needle bearing 87, viewed in the Z-direction, is located halfway in the needle bearing 87 and also halfway in the concertina sleeve 95. Thus, the moment to be transmitted by the concertina sleeve 95 is limited to a minimum so that the concertina sleeve 95 can tilt at the point P during mounting. Since the inner diameter of the inner ring 89 has a clearance $2\Delta D_1$ with respect to the end 81, the draw rod 39 is drawn by means of a tensioning nut 123 (cf. FIG. 2). Thus, the end 81 is slightly widened and the clearance disappears. The needle bearing 87 is now fixed with its inner ring 89 with respect to the end 81 with the centre line of the bearing enclosing the tilting angle $\alpha$ with the Z-axis. The needle bearing 87 has the property that its inner ring can perform a relative translation with respect to its outer ring along the center line of the bearing both during mounting and during operation. Only a small internal frictional force in the bearing need then be overcome. Since during the step of eccentrically arranging the needle bearing, and the tilting then occurring about the point P the inner and outer rings have different tilting radii, the inner ring performs a relative translation with respect to the outer ring. By thus utilizing this property of the needle bearing, it can be prevented that the concertina sleeve 95 is additionally loaded during tilting. In principle, the concertina sleeve 95 could take up by deformation in the axial direction the difference between the tilting radii of the inner and outer rings, but at the expense of a considerable amount of force. It should be noted that the part 97 of the concertina sleeve 95 is arranged to surround the sleeve 91 with clearance. Although the absence of this clearance would admit deformation of the concertina sleeve 95 in the Z-direction, the concertina sleeve 95 would be prevented thereby from bending during mounting. Deformation in the Z-direction is necessary in order to prevent securing of the tilting disk 1 from being statically overdetermined. During operation, the contact point S is already defined in the Z-direction so that the tilting point P has to be able to perform small axial displacements in order to take up any alignment errors or angular errors of the first shaft 19 with respect to the second shaft 23. This can be obtained because of the relative displaceability of the inner and outer diameters of the needle bearing 87. Furthermore, bending of the concertina sleeve 95 is necessary to be able to correct for any alignment errors or angular errors of the first shaft 19 and the second shaft 23. The U-shaped spring 111 has to be able to perform a radial displacement at the area at which it is clamped on the tilting disk 1 because the spring engages the tilting disk in a plane not passing through the tilting point P. In order to facilitate this displacement, the limbs of the spring 111 are provided with rounded ends 125 (cf. FIG. 5).

Betweeen the ball-bearings 63 and 65, the outgoing shaft 23 is provided with a smooth cylindrical part 124, which is located in a chamber 126. This provides the possibility of driving with the part 124 by a friction transmission a translation rod which is passed outside the housing 25. Such an additional driving possibility in principle resembles a pinion-rack transmission, by means of which a rotary movement is converted into a translatory movement.

Figure 6:
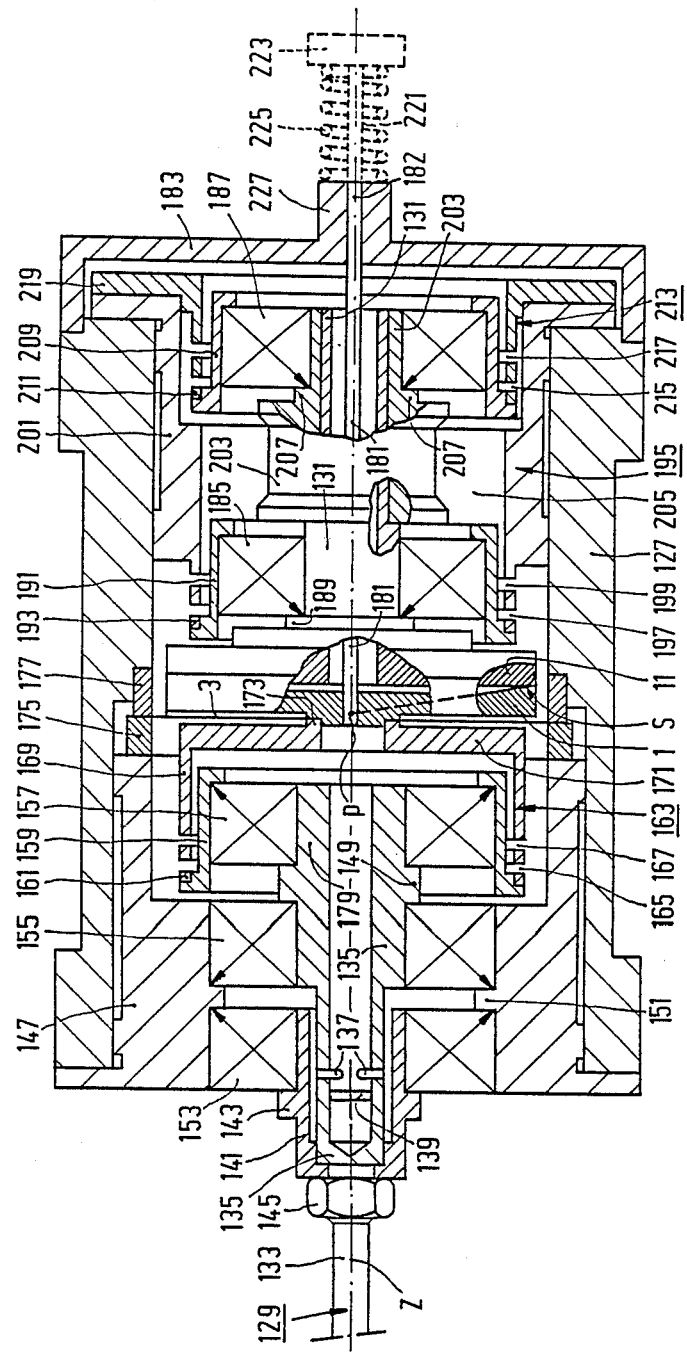
FIG. 6 is a longitudinal sectional view of a second embodiment of the friction-disk transmission.

The second embodiment of the friction-disk transmission shown in FIG. 6 comprises a circular-cylindrical metal housing 127, whose center line coincides with the Z-axis constituting the geometric common axis of rotation of a driven incoming first shaft 129 and a second outgoing shaft 131. The first shaft 129 has a solid part 133 and a tubular part 135 integrated therewith. The tubular part 135 is provided with two pairs of saw-cuts 137 and 139, which are rotated with respect to each other by 90°, and act as a so-called concertina sleeve of the kind already described with reference to FIG. 4. The shaft 129 is inserted into a metal sleeve 141, which is provided with a shoulder 143, and has a thickened threaded part onto which a nut 145 is screwed, which engages the sleeve 141 and in turn urges the latter against the tubular part 135 of the shaft 129. The assembly constituted by the shaft 129, the nut 145 and the sleeve 141 is therefore rotatable about the Z-axis. The housing 127 accommodates a metal sleeve 147, whose center line coincides with the Z-axis. The tubular part 135 of the shaft 129 is provided with a shoulder 149, while the sleeve 147 is provided with a shoulder 151. By means of two ball-bearings 153, 155, the shaft 129 is supported in the housing 127. The inner ring of the ball-bearing 153, enclosed between the shoulders 143 and 151, is glued on the sleeve 141, while the outer ring of the ball-bearing 153 is glued in the sleeve 147. The inner ring of the ball-bearing 155, enclosed between the shoulders 149 and 151, is glued on the part 135 of the shaft 129, while the outer ring is also glued in the sleeve 147. A ball-bearing 157 is enclosed between the shoulder 149 and a metal sleeve 159 pressed against a part 161 of a metal concertina sleeve 163 provided with two pairs of saw-cuts 165 and 167. A part 169 of the concertina sleeve 163 is arranged to surround the sleeve 159 with clearance. The inner ring of the ball-bearing 157 is again glued on the part 135 of the shaft 129, while its outer ring is glued in the sleeve 159. The concertina sleeve 163 is provided on its side facing the tilting point P with a flange 171 with a shoulder 173. The diaphragm 3 is clamped along an outer circle between a pair of metal rings 175 and 177 (fixing members) urged by the sleeve 147. The diaphragm 3 is clamped along an inner circle between the shoulder 173 of the flange 171 and the tilting disk 1. The tilting disk 1, whose center line encloses a tilting angle α with the Z-axis, is located in the contact point S so as to urge a conical contour against a curved edge of the diskshaped supporting member 11 (compare FIG. 1). Viewed in the Z-direction, the supporting member 11 occupies a fixed position. The contact force in the contact point S is produced by an axial pre-tension force of the two concertina sleeves 135 and 163, which also urge the ballbearings 153, 155 and 157 free of clearance. The tubular part of the shaft 129 is provided with an end which is formed so as to be eccentric with respect to the Z-axis and on which is glued the inner ring of the ball-bearing 157. The eccentricity of the cylindrical end 179 is equal to E and is obtained (not shown) because the centre line of this end passes through the point P and encloses the tilting angle α with the Z-axis. Viewed in the Z-direction, the tilting point P is held in place by a flexible metal rod 181 secured at the center of the tilting disk 1. In the case of alignment errors or angular erors of the incoming shaft with respect to the outgoing shaft, the contact point S can perform a displacement in the Z-direction due to the axial deformability of the concertina sleeves 195 and 213. The wire-shaped rod 181 is secured in the proximity of its end 182 remote from the tilting disk 1 in a metal cover 183. The hollow outgoing shaft 131 with which the supporting member 11 forms an integral part is journalled in two ball-bearings 185 and 187. The inner ring of the ball-bearing 185, enclosed between a shoulder 189 of the shaft 131 and a metal sleeve 191, is glued on the shaft 131, while its outer ring is glued in the sleeve 191. The sleeve 191 is engaged by a part 193 of the concertina sleeve 195 which is provided with two pairs of sawcuts 197 and 199 and which has a part 201 is fixedly arranged in the housing 127. The concertina sleeve 195 urges the ball-bearing 185 of clearance. On the shaft 131 is mounted a friction roller 201 on which the inner ring of the ball-bearing 187 is glued. The friction roller 203 is rotatable in a chamber 205, into which a translation rod can be inserted to engage the friction roller 203. The translation rod, which is passed outside the housing and is not shown for the sake of simplicity, can be used in a translation transmission. The ball-bearing 187, enclosed between a shoulder 207 of the friction roller 203 and a metal sleeve 209, is glued with its outer ring in the sleeve 209. The sleeve 209 is engaged by a part 211 of concertina sleeve 213 which is provided with two pairs of saw-cuts 215 and 217 and which concertina sleeve 213 has a part 219 is fixedly arranged in the housing 127. The concertina sleeve 213 urges the ball-bearing 187 free of clearance.

It should be noted that any alignment errors of the shafts 129 and 131 can be neutralized by deformation in the Z-direction of the concertina sleeves 163, 195 and 213. Since the point P is fixed and the contact point S is axially displaceable with axial deformation of the concertina sleeves 195 and 213, the support of the tilting disk 1 is prevented from being statially overdetermined. The contact force at the contact point S produced by the pre-tension force in the concertina sleeves 195 and 213 may also be obtained by lengthening the rod 181 at area 221 by a flange 223 and by pre-stressed by means of a spring 225. The end 182 of the rod 181 is then slidably journalled in a bearing 227, which forms part of the cover 183. In this case, the axially deformable concertina sleeve 195 cannot be maintained because the position of the tilting point P is then no longer defined. The sleeve 213 may for this purpose be secured, for example, directly to the housing 127.

The friction-disk transmissions described with reference to FIGS. 2 and 6 satisfy the principle shown in FIG. 1. However, while maintaining this principle, a number of variations are possible, as will be explained diagrammatically with reference to FIGS. 7 and 8.

Figure 7:
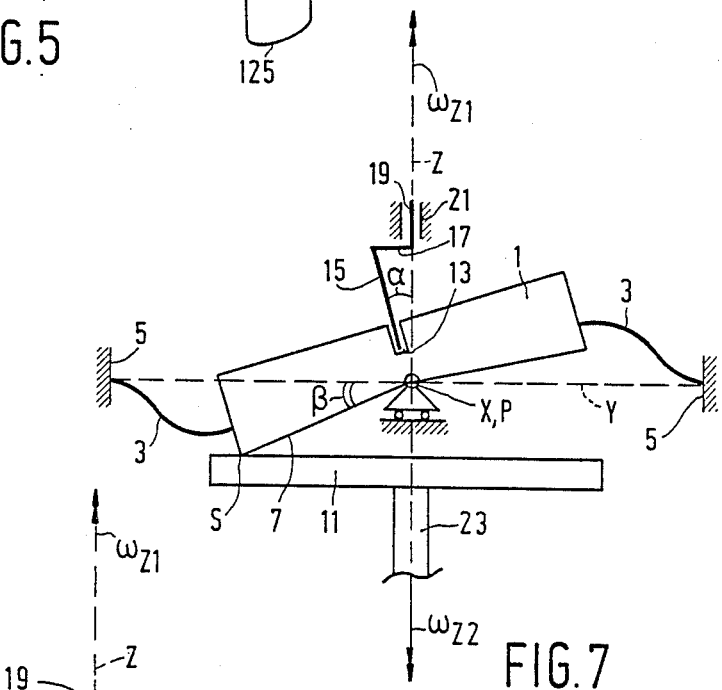
FIG. 7 shows diagrammatically a third embodiment of the friction-disk transmission.

In a third embodiment shown in FIG. 7, the tilting disk 1 engages at the contact point S the flat upper surface of the supporting member 11 in the form of a circular disk. At the area of the contact point S, the tilting disk 1 is preferably provided with a small rounded portion in order to prevent the tilting disk 1 from digging into the supporting member 11. The transmission ratio satisfies the relation:

$$(\omega_{Z2}/\omega_{Z1}) = -\tan \alpha \cdot \tan \beta.$$

By varying the angle $\beta$, a large range of transmission ratios can be obtained.

Figure 8:
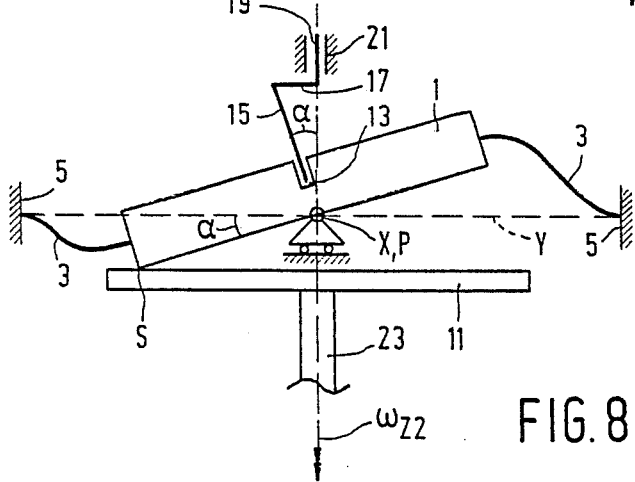
FIG. 8 shows diagrammatically a fourth embodiment of the friction-disk transmission.

In a fourth embodiment shown in FIG. 8, the tilting disk 1 consists of a circular disk having parallel flat end faces. The conical contour 7 of FIG. 7 is not present in this case so that $\beta = \alpha$ and the transmission ratio satisfies the relation $$(\omega_{Z2}/\omega_{Z1}) = -\tan^2 \alpha.$$

In this case, the transmission ratio can be varied only by varying the tilting angle α. However, this requires a drastic change in the construction rather than a variation of the angle $\beta$.

The annular spring 3 may be in the form of a closed diaphragm, but also may be in the form of an open spring, for example, in the shape of an inner and an outer ring which are interconnected by flexible spokes (waggon-wheel shape). These spokes may extend radially as well as partly radially and partly tangentially. A closed diaphragm affords the advantage that a vacuum-tight passage is automatically obtained. This is of major importance, for example, if the friction-disk transmission is used in so-called goniometers for electron microscopes, X-ray diffractometers, and X-ray spectrometers as well as in the manufacture of integrated semiconductor circuits in lithographic apparatus (such as, so-called pattern generators, wafer steppers, ion implanters), The friction transmission can be driven by means of electric motors of different types, as the case may be, with an additional reduction stage between the outgoing shaft of the electric motor and the incoming shaft 19 and the draw rod 39, respectively, of the friction-disk transmission. Mention is also particularly made of the use of a stepping motor. If, for example, in the present case, with a transmission ratio $$(\omega_{Z2}/\omega_{Z1}) = (-1/500)$$

a stepping motor were used, in which 200 pulses correspond to one complete revolution of the incoming shaft of the friction-disk transmission, a carriage coupled with the transmission can be displaced over a distance of 0.4 μm per pulse. It is clear that the transmission affords particular advantages in performing very small displacements, such as required, for example, in micromanipulators.

The conical contour 7 may have an orientation other than that shown, in other words, it may occupy a position mirrored with respect to the position shown in FIG. 1. The curved edge 9 of the supporting member 11 may also be a conical contour. In the present case, the annular spring (diaphragm) 3 is made of chromium-nickel steel having a thickness of 0.1 mm, a free inner diameter of 5 mm, and a free outer diameter of 28 mm. These dimensions make it clear that with the transmission described a very compact construction is obtained.

What is claimed is:

1. A friction-disk transmission comprising
   a first shaft and a second shaft, each of said first shaft and said second shaft extending along a common axis of rotation, and each of said first shaft and said second shaft being rotated about said common axis;
   a circular disk arranged between said first shaft and said second shaft, said circular disk being tilted at a point on said common axis about two orthogonal axes intersecting at said point, said two orthogonal axes being perpendicular to said common axis;
   drive means coupled with said circular disk for providing eccentric motion about said common axis;
   stationary fixing means surrounding said circular disk for preventing said circular disk from being rotated about said common axis;
   spring means annularly surrounding said circular disk for supporting said circular disk to said stationary fixing means, said spring means being secured to an inner portion of said stationary fixing means and an outer portion of said circular disk; and
   supporting means coupled with said second shaft for determining rotation of said circular disk about said two orthogonal axis, said circular disk being rolled with frictional contact across said supporting means;
   wherein a contact point between said circular disk and said supporting means provides said frictional contact in a circular path, said supporting means occupying a fixed axial position with respect to said common axis.

2. A friction-disk transmission according to claim 1, wherein said supporting means is provided with a curved surface facing said circular disk, and said circular disk is provided with a conical surface mating with said curved surface at said contact point, said conical surface having an apex coinciding with said point of intersection of said two orthogonal axes on said common axis.

3. A friction-disk transmission according to claim 1, wherein said first shaft is coupled with an end of a clamping bushing, said end acting eccentrically with respect to said common axis, wherein a rod is provided for rotating said clamping bushing about said common axis, wherein a rotational bearing and a further bushing are provided to cause said spring means to be bent to define a tilting angle of said circular disk, said rotational bearing being tilted with respect to said common axis, said further bushing being provided with cuts and being tilted with respect to said common axis, and wherein a U-shaped spring urges said circular disk against said supporting means at said contact point.

4. A friction-disk transmission according to claim 3, wherein said further bushing has said cuts annularly about said further bushing.

5. A friction-disk transmission according to claim 1, wherein said first shaft is provided with an eccentrically acting end, wherein a rotational bearing and a further bushing are provided to cause said spring means to be bent to define a tilting angle of said circular disk, said further bushing being provided with cuts and being tilted with respect to said common axis, wherein a flexible rod defines a tilting point of said circular disk in a direction toward said common axis, and wherein at least one additional bushing is provided with cuts to urge said supporting means against said circular disk at said contact point.

6. A friction-disk transmission according to claim 5, wherein said cuts of both said further bushing and said additional bushing are provided annularly about said bushings.

7. A friction-disk transmission according to claim 1, wherein said spring means is a closed flexible diaphragm spring forming a vacuum tight seal between said first shaft and said second shaft.

* * * * *